(12) United States Patent
Wang et al.

(10) Patent No.: US 11,482,925 B2
(45) Date of Patent: Oct. 25, 2022

(54) RESONANT CONVERTER AND VARIABLE CUTOFF FREQUENCY CONTROL METHOD

(71) Applicant: ECOFLOW INC., Shenzhen (CN)

(72) Inventors: Lei Wang, Shenzhen (CN); Wenping Tong, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 0 days.

(21) Appl. No.: 17/743,908

(22) Filed: May 13, 2022

(65) Prior Publication Data
US 2022/0302825 A1 Sep. 22, 2022

Related U.S. Application Data

(63) Continuation of application No. PCT/CN2021/111125, filed on Aug. 6, 2021.

(30) Foreign Application Priority Data

Mar. 18, 2021 (CN) .......................... 202110291735.4

(51) Int. Cl.
*H02M 3/00* (2006.01)
*H02M 1/00* (2006.01)
*H02M 3/335* (2006.01)

(52) U.S. Cl.
CPC ......... *H02M 3/015* (2021.05); *H02M 1/0058* (2021.05); *H02M 3/33573* (2021.05)

(58) Field of Classification Search
CPC . H02M 3/015; H02M 1/0058; H02M 3/33573
See application file for complete search history.

(56) References Cited

U.S. PATENT DOCUMENTS

| | | | | |
|---|---|---|---|---|
| 8,699,239 | B2* | 4/2014 | Halberstadt | H02M 3/3376 |
| | | | | 323/284 |
| 9,281,752 | B2* | 3/2016 | Fu | H02M 3/33576 |
| 10,069,403 | B1* | 9/2018 | Lim | H02M 3/33571 |
| 10,931,204 | B1* | 2/2021 | Han | H02M 3/33507 |
| 2015/0124492 | A1 | 5/2015 | Fu et al. | |

FOREIGN PATENT DOCUMENTS

| | | |
|---|---|---|
| CN | 104638895 A | 5/2015 |
| CN | 105576981 A | 5/2016 |
| CN | 108667299 A | 10/2018 |
| CN | 112688574 A | 4/2021 |

OTHER PUBLICATIONS

The World Intellectual Property Organization (WIPO) International Search Report for PCT/CN2021/111125 dated Nov. 26, 2021 4 Pages (with translation).

* cited by examiner

*Primary Examiner* — Kyle J Moody
(74) *Attorney, Agent, or Firm* — Anova Law Group, PLLC

(57) ABSTRACT

A resonant converter and a variable cutoff frequency control method of the resonant converter are provided. The variable cutoff frequency control method includes obtaining a first relationship between a lower limit frequency of the resonant converter and a preset voltage outputted by the resonant converter; updating the preset voltage in the first relationship to a correlative voltage between the preset voltage and an actual voltage outputted by the resonant converter, to obtain a second relationship between the lower limit frequency and the correlative voltage; and limiting the lower limit frequency of the resonant converter according to the second relationship.

20 Claims, 8 Drawing Sheets

| Obtaining a first relationship between the lower limit frequency of the resonant converter and the preset voltage outputted by the resonant converter | S301 |

| Updating the preset voltage in the first relationship to a correlative voltage between the preset voltage and the actual voltage outputted by the resonant converter, to obtain a second relationship between the lower limit frequency and the correlative voltage | S302 |

| Limiting the lower limit frequency of the resonant converter according to the second relationship | S303 |

Figure 3

| Controlling the resonant converter to output the preset voltage, and lowering the bus voltage of the resonant converter | S401 |

| Obtaining the lower limit frequency after lowering the bus voltage | S402 |

| Performing a curve fitting on multiple preset voltages and multiple corresponding lower limit frequencies, to obtain a relationship curve between the lower limit frequency and the preset voltage | S403 |

| Obtaining the first relationship between the lower limit frequency and the preset voltage according to the relationship curve | S404 |

Figure 4

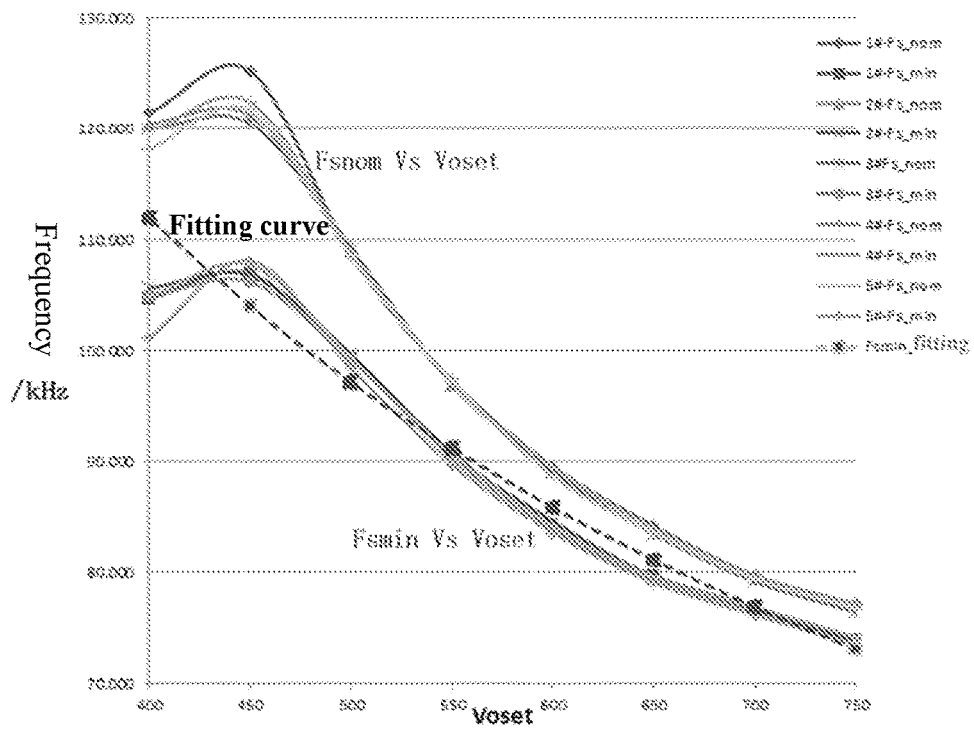

Figure 5

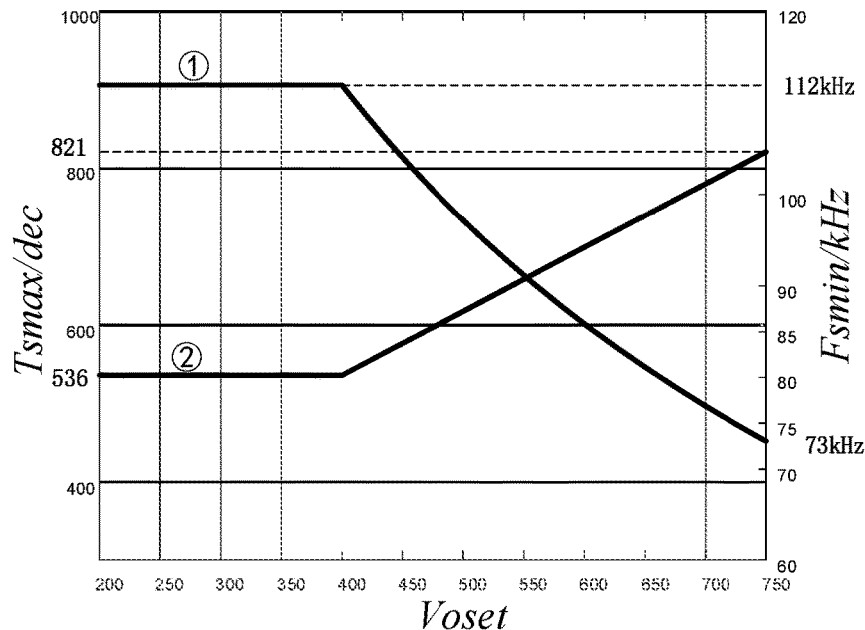
Figure 6
| Obtaining at least two sets of data from the relationship curve, and the data may include the correlative voltage and the lower limit frequency corresponding to the correlative voltage | S701 |
| Determining the weight of the preset voltage and the weight of the actual voltage based on the correlative voltage, the lower limit frequency and the actual voltage | S702 |
Figure 7
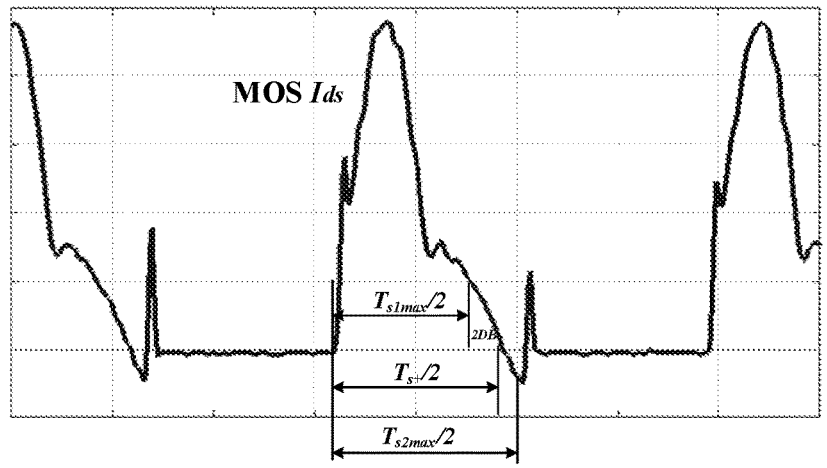
Figure 8

RESONANT CONVERTER AND VARIABLE CUTOFF FREQUENCY CONTROL METHOD

CROSS-REFERENCE TO RELATED APPLICATIONS

This application is a continuation application of PCT Patent Application No. PCT/CN2021/111125, filed on Aug. 6, 2021, which claims priority to Chinese patent application No. 202110291735.4, filed with the Chinese National Intellectual Property Administration on Mar. 18, 2021, entitled "RESONANT CONVERTER AND VARIABLE CUTOFF FREQUENCY CONTROL METHOD", the entirety of which is incorporated herein by reference.

FIELD

The present disclosure generally relates to the field of converter and, more particularly, relates to a resonant converter and a variable cutoff frequency control method.

BACKGROUND

Direct current (DC) is converted into an alternating square wave voltage or current through a chopper circuit, and, after being applied to two ends of a resonant network, a high-frequency resonance is generated. A resonant voltage or current is converted into a DC voltage or current after being rectified and filtered to realize direct current to direct current (DC-DC) conversion. There are many different classification methods for resonant converters. According to a connection relationship of components of the resonant circuit, resonant converters may be divided into series resonant converters, parallel resonant converters, and series-parallel resonant converters.

A converter including two inductors and a capacitor (LLC) is a series-parallel resonant converter, which is featured with advantages of achieving a zero voltage switch (ZVS) of a master MOS switch on a primary side and a zero current switch (ZCS) of a synchronous rectifier diode on a secondary side, reducing the switching loss and improving the efficiency and power density of the resonant converter through the soft switching technology.

However, during the operating process of the resonant converter, the converter will enter a ZCS region during current-limiting unloading and current-limiting start-up conditions (e.g., referring to FIG. 1, the actual output is overloaded, and the lower limit frequency calculation is lower than a theoretical value), which causes the overcurrent protection and shut down of the resonant converter, and the resonant converter is invalid.

SUMMARY

One aspect of the present disclosure provides a variable cutoff frequency control method of a resonant converter. The method includes obtaining a first relationship between a lower limit frequency of the resonant converter and a preset voltage outputted by the resonant converter. The method also includes updating the preset voltage in the first relationship to a correlative voltage between the preset voltage and an actual voltage outputted by the resonant converter, to obtain a second relationship between the lower limit frequency and the correlative voltage. Further, the method includes limiting the lower limit frequency of the resonant converter according to the second relationship.

Another aspect of the present disclosure provides a variable cutoff frequency control method of a resonant converter. The method includes obtaining a first relationship between a lower limit frequency of the resonant converter and a preset voltage outputted by the resonant converter. The method also includes updating the preset voltage in the first relationship to a correlative voltage between the preset voltage and an actual voltage outputted by the resonant converter, to obtain a second relationship between the lower limit frequency and the correlative voltage. Further, the method includes limiting the lower limit frequency of the resonant converter according to the second relationship. The second relationship satisfies that the correlative voltage is equal to a weighted sum of the preset voltage and the actual voltage. The first relationship satisfies that the lower limit frequency is equal to a quotient of 60M and a duty cycle, where the duty cycle is a linear function of the preset voltage.

Another aspect of the present disclosure provides a resonant converter. The resonant converter includes a memory configured to store program instructions for performing a variable cutoff frequency control method, and a processor coupled with the memory. When executing the program instructions, the processor is configured to obtain a first relationship between a lower limit frequency of the resonant converter and a preset voltage outputted by the resonant converter. The processor is also configured to update the preset voltage in the first relationship to a correlative voltage between the preset voltage and an actual voltage outputted by the resonant converter, to obtain a second relationship between the lower limit frequency and the correlative voltage. Further, the processor is configured to limit the lower limit frequency of the resonant converter according to the second relationship.

Another aspect of the present disclosure provides a non-transitory computer-readable storage medium, containing program instructions for, when being executed by a processor, performing a variable cutoff frequency control method of a resonant converter. The method includes obtaining a first relationship between a lower limit frequency of the resonant converter and a preset voltage outputted by the resonant converter. The method also includes updating the preset voltage in the first relationship to a correlative voltage between the preset voltage and an actual voltage outputted by the resonant converter, to obtain a second relationship between the lower limit frequency and the correlative voltage. Further, the method includes limiting the lower limit frequency of the resonant converter according to the second relationship.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

FIG. 3 illustrates a schematic flowchart of an exemplary variable cutoff frequency control method of a resonant converter consistent with disclosed embodiments of the present disclosure;

FIG. 4 illustrates a detailed schematic flowchart of S301 in an exemplary variable cutoff frequency control method of a resonant converter in FIG. 3 consistent with disclosed embodiments of the present disclosure;

FIG. 5 illustrates a schematic diagram of a relationship curve between a lower limit frequency and a preset voltage of an exemplary resonant converter consistent with disclosed embodiments of the present disclosure;

FIG. 6 illustrates a schematic diagram of a relationship curve between a lower limit frequency and a preset voltage of another exemplary resonant converter consistent with disclosed embodiments of the present disclosure;

FIG. 7 illustrates a schematic flowchart of determining a preset voltage weight and an actual voltage weight of an exemplary resonant converter consistent with disclosed embodiments of the present disclosure;

FIG. 8 illustrates a schematic diagram of an Ids waveform of a DC MOS when an exemplary resonant converter enters a zero current switch region consistent with disclosed embodiments of the present disclosure;

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
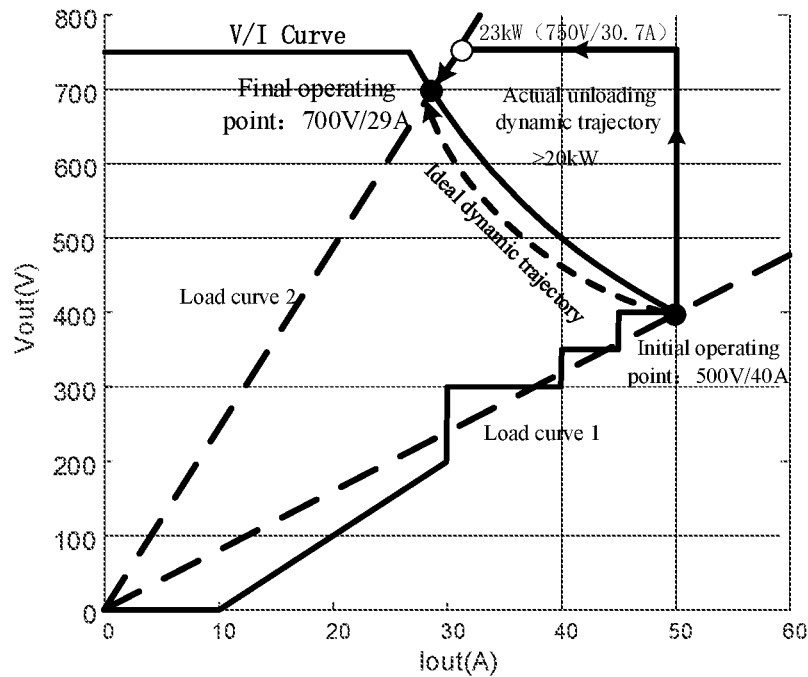
FIG. 1 illustrates a schematic diagram of a movement trajectory of a dynamic operating point of a resonant converter under unloading conditions.
Figure 2A:
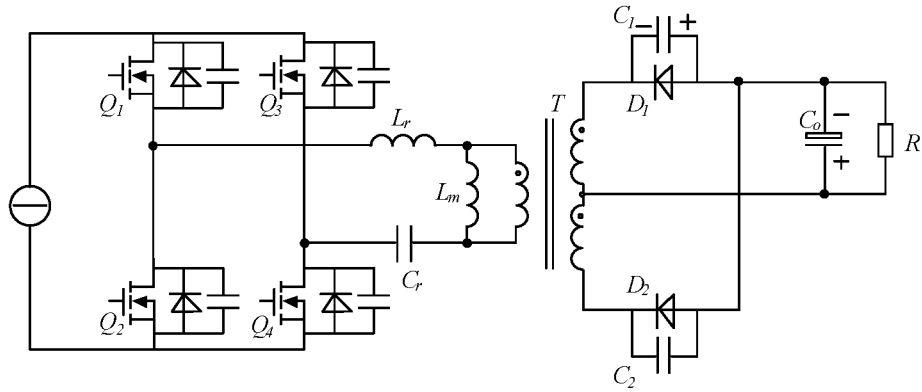
FIG. 2A illustrates a schematic diagram of a simple circuit structure of an exemplary resonant converter consistent with disclosed embodiments of the present disclosure.

The present disclosure provides a resonant converter. FIG. 2A illustrates a schematic diagram of a simple circuit structure of the resonant converter. The resonant converter may include a switching network (not shown in the Figure), a resonant network (not shown in the Figure), a center-tap transformer T, a synchronous rectifier diode D1 on the secondary side and a filter capacitor C1 thereof, a synchronous rectifier diode D2 on a secondary side and a filter capacitor C2 thereof, an output filter capacitor Co, and a load R, etc. The switching network may include master MOS switches (Q1-Q4) and internal parasitic diodes (not shown in the Figure) and parasitic capacitors (not shown in the Figure) thereof. The resonant network may include a resonant capacitor Cr, a series resonant inductor Lr, and a parallel resonant inductor Lm. The synchronous rectifier diodes (D1, D2) in FIG. 2A may be the parasitic diodes of the synchronous rectifier power tube on the secondary side. FIG. 2A may omit the synchronous rectifier power tubes on the secondary side and may merely illustrate the parasitic diodes (D1, D2) and the parasitic capacitors (C1, C2).

Figure 2B:
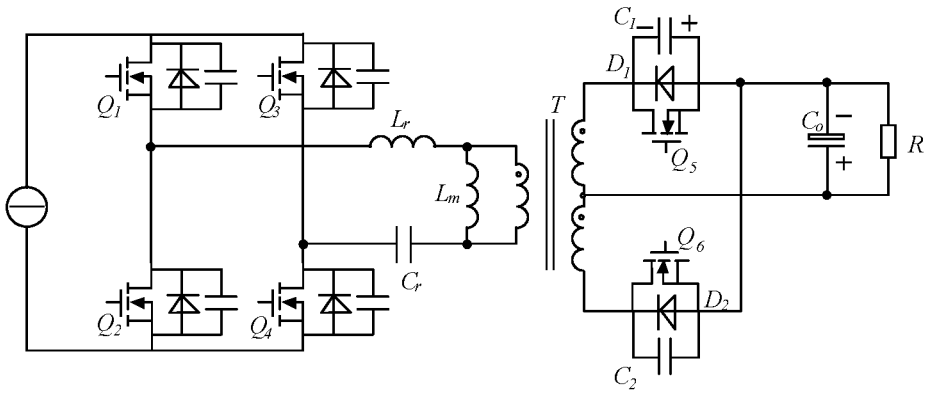
FIG. 2B illustrates a schematic diagram of a detailed circuit structure of an exemplary resonant converter consistent with disclosed embodiments of the present disclosure.
Figure 9:
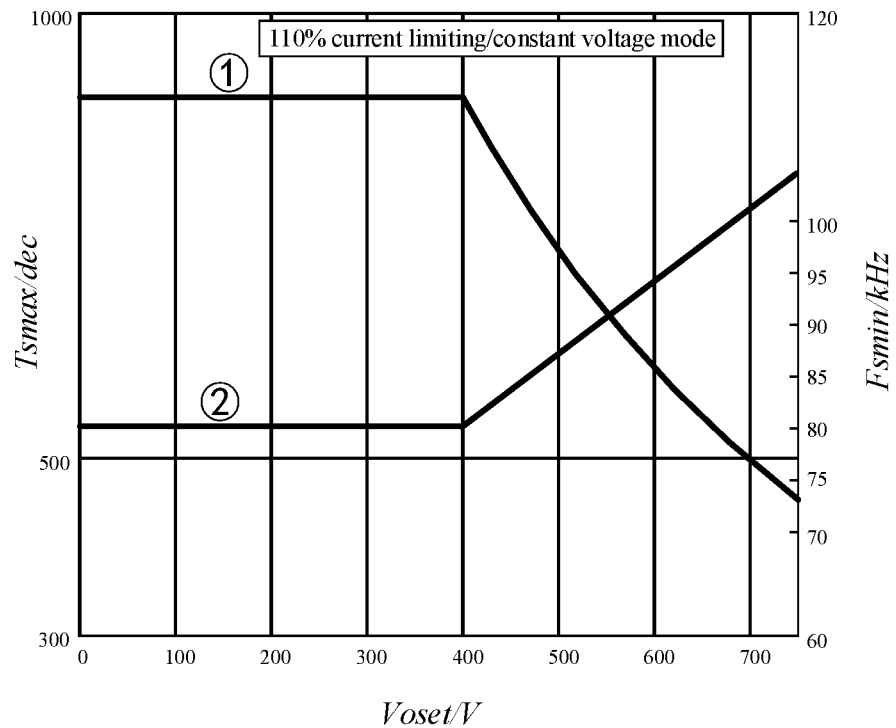
FIG. 9 illustrates a schematic diagram of a relationship curve between a lower limit frequency and an actual voltage of an exemplary resonant converter in a constant voltage mode ($V_{oset}=V_o$) consistent with disclosed embodiments of the present disclosure.

FIG. 2B illustrates a schematic diagram of a detailed circuit structure of the resonant converter. The resonant converter may include the switching network (not shown in the Figure), the resonant network (not shown in the Figure), the center-tap transformer T, a synchronous rectifier power tube Q5 on the secondary side and the internal parasitic diode D1 and parasitic capacitor C1 thereof, a synchronous rectifier power tube Q6 on the secondary side and the internal parasitic diode D2 and parasitic capacitor C2 thereof, the output filter capacitor Co, and the load R, etc. The switching network may include the master MOS switches (Q1-Q4) and the internal parasitic diodes (not shown in the Figure) and parasitic capacitors (not shown in the Figure) thereof. The resonant network may include the resonant capacitor Cr, the series resonant inductor Lr, and the parallel resonant inductor Lm.

In certain embodiments, the resonant converter may include a half-bridge resonant converter, etc. The resonant converter may adopt following variable cutoff frequency control method to achieve lower limit frequency control.

The present disclosure also provides a variable cutoff frequency control method of a resonant converter. FIG. 3 illustrates a schematic flowchart of a variable cutoff frequency control method of a resonant converter consistent with disclosed embodiments of the present disclosure. The variable cutoff frequency control method of the resonant converter may include following.

S301: obtaining a first relationship between the lower limit frequency of the resonant converter and the preset voltage outputted by the resonant converter.

In the first relationship, the lower limit frequency may be on the basis of the constant voltage state, the operating frequency of the resonant converter operated with full load under different preset voltages.

Optionally, step S301 may be implemented through the method shown in FIG. 4, which may include S401-S404.

S401: controlling the resonant converter to output the preset voltage, and lowering the bus voltage of the resonant converter.

The resonant converter may be set to enter a debugging mode in backstage. The resonant converter may output the preset voltage and may operate with full load. The bus voltage may be continuously reduced until the resonant converter cannot stably operate with load. The operating frequency of the resonant converter under such operating condition may be a lower limit frequency of the corresponding voltage.

S402: obtaining the lower limit frequency after lowering the bus voltage.

After lowering the bus voltage, the operating frequency at which the resonant converter cannot stably operate with load may be the lower limit frequency. In an application scenario, the test data of voltage parameters and frequency parameters of the resonant converter are illustrated in Table 1.

TABLE 1

| $V_{pfc}$/V | $V_{oset}$/V | $F_{snom}$/KHz | Lowering $V_{pfc}$/V | $F_{smin}$/KHz |
|---|---|---|---|---|
| 825 | 750 | 77.121 | 770 | 73.89 |
| 825 | 700 | 79.681 | 770 | 76.82 |
| 825 | 650 | 84.151 | 770 | 79.68 |
| 825 | 600 | 89.552 | 770 | 84.15 |
| 825 | 550 | 97.245 | 770 | 90.77 |
| 825 | 500 | 108.696 | 750 | 99.17 |
| 800 | 450 | 125.261 | 735 | 106.95 |
| 715 | 400 | 121.457 | 670 | 104.71 |
| 650 | 300 | 153 | / | / |
| 650 | 200 | 205 | / | / |

Further, $F_{snom}$ may be the operating frequency when the resonant converter does not adjust the bus voltage $V_{pfc}$ and operates with full load; $F_{smin}$ may be a lowest frequency at which the resonant converter is capable of operating stably when the bus voltage $V_{pfc}$ is lowered; when the bus voltage $V_{pfc}$ is 800V, and the outputted preset voltage $V_{oset}$ is 450V, the resonant converter may operate at a resonant point; and when the outputted preset voltage $V_{oset}$ is less than or equal to 350V, the operating frequency $f_s$ of the resonant converter may be greater than a resonant frequency $f_r$, and the resonant converter may not enter the ZCS region, such that the lower limit frequency may not be tested. The limit on the lower limit frequency of the resonant converter may merely be for the bus voltage in a range of approximately 400V-750V.

Further, the test environment of the test data may include: an oscilloscope DSO3034A (Keysight); a current gun TCPA300/TCP305A; a high voltage probe P5100A (Tektronix); a common probe N2843A (Keysight); a load of 800V DC load cabinet; and an AC source of 30KVA. The key material information of the resonant converter may include following: PCB version of R153B240U1(V5.0) and R153B240U2(V5.2); PFC MOS=TK39N60W; PFC DIODE=APT30DQ120BG; DC MOS= FMW60N075S2FDHF; DC DIODE=APT30DQ100BG; PFC inductor=R153B240L3(SPT); resonant inductor=R203G336L4(JQH 1839); DC main transformer=R203G336T3(JQH 1839); and program version R203B240U111(PFC_2Fan)_V102.out and R203B336U211(DCDC)V100.out.

According to the test data, there may be a certain margin between $F_{snom}$ and $F_{smin}$. Based on the mass production experience of resonant converters, there may be a 2 kHz margin at the normal operating frequency of the resonant converter, which may ensure the full power output of resonant converters at mass production.

It should be noted that from the perspective of software, the present disclosure may adopt a variable limit frequency control method to limit the lower limit frequency, such that the limited lower limit frequency may have the above margin.

S403: performing a curve fitting on multiple preset voltages and multiple corresponding lower limit frequencies, to obtain a relationship curve between the lower limit frequency and the preset voltage.

To ensure the universality of the test data, multiple sets of test data may be obtained by multiple resonant converters. FIG. 5 fits the test data in the Table 1 and the test data of other four resonant converters. Referring to FIG. 5, multiple resonant converters may be used to obtain multiple sets of test data, and one preset voltage may correspond to multiple lower limit frequencies. A maximum value of the multiple lower limit frequencies may be selected as the lower limit frequency corresponding to the preset voltage. In certain embodiments, the relationship curve between the lower limit frequency and the preset voltage may be obtained by any other fitting method.

Further, the relationship curves in FIG. 5 may be organized to obtain the relationship curves shown in FIG. 6.

S404: obtaining the first relationship between the lower limit frequency and the preset voltage according to the relationship curve.

FIG. 6 illustrates the relationship between the lower limit frequency, preset voltage and duty cycle of the resonant converter. In FIG. 6, the abscissa represents the outputted preset voltage $V_{oset}$, the ordinate on the left in FIG. 6 represents the duty cycle $T_{smax}$, and the ordinate on the right in FIG. 6 represents the lower limit frequency $F_{smin}$. In FIG. 6, the curve ① represents the relationship between the lower limit frequency $F_{smin}$ and the outputted preset voltage $V_{oset}$, and the curve ② represents the relationship between the duty cycle $T_{smax}$ and the outputted preset voltage $V_{oset}$.

According to the relationship curve in FIG. 6, the first relationship between the lower limit frequency and the preset voltage may be obtained. The first relationship may satisfy: the lower limit frequency may be equal to a quotient of 60M and the duty cycle, and the duty cycle may be a linear function of the preset voltage. Specifically, $T_{smax}=a*V_{oset}+b$, and $F_{smin}=60M/T_{smax}$, where $T_{smax}$ may be the duty cycle, and a and b may be a constant greater than zero.

From the above analysis, referring to FIG. 6, the first relationship and a second relationship in the present disclosure may merely be for the case where the operating frequency $f_s$ of the resonant converter is less than the resonant frequency $f_r$ of the resonant converter. While for a case where the operating frequency $f_s$ is greater than the resonant frequency $f_r$, the resonant converter may not enter the ZCS region, and the lower limit frequency may not need to be limited.

Therefore, in the above application scenarios, the limiting strategy of lower limit frequency may be fitted according to the above test data, which may include: when $V_{oset}=400V-750V$, $T_{smax}=0.815*V_{oset}+210$, and $F_{smin}=60M/T_{smax}$; and when $V_{oset}=200V-400V$, $T_{smax}=536$, and $F_{smin}=112$ kHz. When $V_o<400V, f_s>f_r$, and the resonant converter may not enter the ZCS region.

In certain embodiments, a and b may be adjusted appropriately according to different $V_{oset}$.

S302: updating the preset voltage in the first relationship to a correlative voltage between the preset voltage and the actual voltage outputted by the resonant converter, to obtain a second relationship between the lower limit frequency and the correlative voltage (e.g., the preset voltage and the actual voltage).

The second relationship may satisfy: the correlative voltage may be equal to a weighted sum of the preset voltage and the actual voltage. Specifically, $V_k=k_1*V_{oset}+k_2*V_o$, where $V_k$ may be the correlative voltage, $V_o$ may be the outputted actual voltage, $k_1$ (a weight of the preset voltage) may be a constant greater than zero, $k_2$ (a weight of the actual voltage) may be a constant greater than zero, and $k_1+k_2=1$ (not to change the lower limit frequency when operating in a constant voltage state).

In one embodiment, the weight of the preset voltage, i.e., $k_1$, and the weight of the actual voltage, i.e., $k_2$, may be determined according to the method shown in FIG. 7. The method shown in FIG. 7 may include S701 and S702.

S701: obtaining at least two sets of data from the relationship curve, and the data may include the correlative voltage and the lower limit frequency corresponding to the correlative voltage.

FIG. 8 illustrates a schematic diagram of an Ids waveform of a DC MOS when the resonant converter enters the ZCS region. Referring to FIG. 8, $1/(T_{s2max}/2)$ may be the operating frequency when entering the ZCS region, and $T_{s+}/2$ may be the positive half-cycle pulse width length, $T_{s1max}/2=T_{s+}/2-2DB$ may be the expected duty cycle, and $F_{s1min}=1/(T_{s1max}/2)$ may be the expected lower limit frequency. To make the lower limit frequency meet $F_{s1min}$ when the resonant converter enters current-limiting unloading state, the $V_{oset}$ corresponding to $F_{s1min}$ may be found in the relationship curve in FIG. 6 as $V_k$.

S702: determining the weight of the preset voltage and the weight of the actual voltage based on the correlative voltage, the lower limit frequency and the actual voltage.

The $k_1$ and $k_2$ may be obtained by solving equations: $k_1+k_2=1$, and $k_1*750V+k_2*V_o=V_k$. The test data and calculation results when setting $V_{oset}=750V$ and current-limiting of 110% are illustrated in Table 2.

To cover the requirements of various current-limiting unloading conditions on the lower limit frequency, the $k_1$ value may be selected as 0.56, and the $k_2$ value may be selected as 0.44.

Accordingly, the improved limiting strategy of lower limit frequency may include: when $V_{oset}=400V-750V$, $T_{smax}=0.815*V_k+210$, $F_{smin}=60M/T_{smax}$, $V_k=k_1*V_{oset}+k_2*V_o$, $k_1=0.56$, and $k_2=0.44$; and when $V_{oset}=200V-400V$, $T_{smax}=536$, and $F_{smin}=112$ kHz.

S303: limiting the lower limit frequency of the resonant converter according to the second relationship.

The lower limit frequency of the resonant converter may be limited by the above limiting strategy.

Different from the conventional technology, the preset voltage in the first relationship between the lower limit frequency of the resonant converter and the preset voltage outputted by the resonant converter may be undated to the correlative voltage between the preset voltage and the actual voltage outputted by the resonant converter. Therefore, the output voltage configured to calculate the lower limit frequency may lag (be less than) the preset voltage, the lower limit frequency obtained according to the second relationship may be substantially small, and may have a certain margin. Thus, the problem of the resonant converter entering the ZCS region may be improved, and the problem of failure of the resonant converter may be improved.

When the resonant converter is in the start-up condition, the outputted preset voltage $V_{oset}=0$, and the calculated lower limit frequency may be too high, which may cause the resonant converter to easily enter the ZCS region. To solve such problem, in the start-up condition, if the preset voltage is less than the voltage threshold, the preset voltage may be updated to the voltage threshold.

The method for determining the voltage threshold may refer to the method for determining the above $k_1$ and $k_2$, which may not be repeated herein.

The test data of the resonant converter in the start-up condition ($V_{oset}=750V$, and current-limiting of 110%) are illustrated in Table 3.

TABLE 2

| Current-limiting unloading condition | Lowest operating frequency | $T_{s+}/2$ | $T_{s1max}/2$ | $F_{s1min}$ | $k_1$ | $k_2$ | Notes |
|---|---|---|---|---|---|---|---|
| 600V/33A-> 740V/27A | 73 kHz | / | / | / | / | / | No ZCS |
| 500V/40A-> 675V/30A | 73.5 kHz | / | / | / | / | / | No ZCS |
| 400V/50A-> 480V/42A | 73.1 kHz | 6.4 μs | 5.8 μs | 86 kHz | 0.5603 | 0.4397 | |
| 300V/40A-> 452V/44A | 73 kHz | 6.1 μs | 5.5 μs | 98 kHz | 0.5609 | 0.4391 | |
| 275V/30A-> 523V/38.3A | 412 kHz | / | / | / | / | / | No ZCS |
| 200V/30A-> 262V/30A | 178 kHz | / | / | / | / | / | No ZCS |

TABLE 3

| Start-up condition | Lowest operating frequency | $T_{s+}/2$ | $T_{s1max}/2$ | $F_{s1min}$ | $V_k$/V | $V_m$/V |
|---|---|---|---|---|---|---|
| 0->650V/30.6A | Normal start-up | / | / | / | / | / |
| 0->600V/33.3A | 74 kHz | / | / | / | / | / |
| 0->550V/36.2A | 74 kHz | / | / | / | / | / |
| 0->500V/40A | 73.6 kHz | 5.8 μs | 5.2 μs | 98 kHz | 493 | 166 |
| 0->450V/44.5A | 73.1 kHz | 5.7 μs | 5.1 μs | 98 kHz | 493 | 166 |
| 0->427V/47A | Normal start-up | / | / | / | / | / |
| 0->400V/500A | Normal start-up | / | / | / | / | / |
| 0->220V/30A | Normal start-up | / | / | / | / | / |

When $V_{oset}$ reaches 690V, the resonant converter may operate with heavy-load at a frequency limited to the lowest frequency of 73 kHz, and may not enter the ZCS region. The power may be reduced, while the bus voltage may be maintained at 825V without active adjustment margin, and may merely be upward adjusted passively to trigger the overvoltage protection of the bus.

When $V_{oset}$ reaches 650V, the resonant converter may operate with heavy-load at a frequency limited to 74 kHz, and may not enter the ZCS region, which may trigger the overvoltage protection of the bus.

When $V_{oset}$ reaches 540V, the resonant converter may operate with heavy-load at a frequency limited to 73.6 kHz, and may slightly enter the ZCS region, which may trigger the overvoltage protection of the bus.

When $V_{oset}$ reaches 510V, the resonant converter may operate with heavy-load at a frequency limited to 73.1 kHz, and may enter the ZCS region, which may trigger over current protection (OCP) and the overvoltage protection of the bus.

To cover the requirements of various current-limiting start-up conditions on the lower limit frequency and to have a certain margin, the voltage threshold may be determined as $V_m$=190V.

Accordingly, the improved limiting strategy of lower limit frequency may include: when $V_{oset}$=400V-750V, $T_{smax}$=0.815*|$V_k$|+210 μs, $F_{smin}$=60M/$T_{smax}$, $V_k$=$k_1$*$V_{oset}$+ $k_2$*$V_o$, $k_1$=0.56, and $k_2$=0.44; when $V_{oset}$=200V-400V, $T_{smax}$=536 μs, $F_{smin}$=112 kHz; and at the same time,
if ($V_{oset}$<190V)
{
    $V_{oset}$=190V
}.

Figure 10:
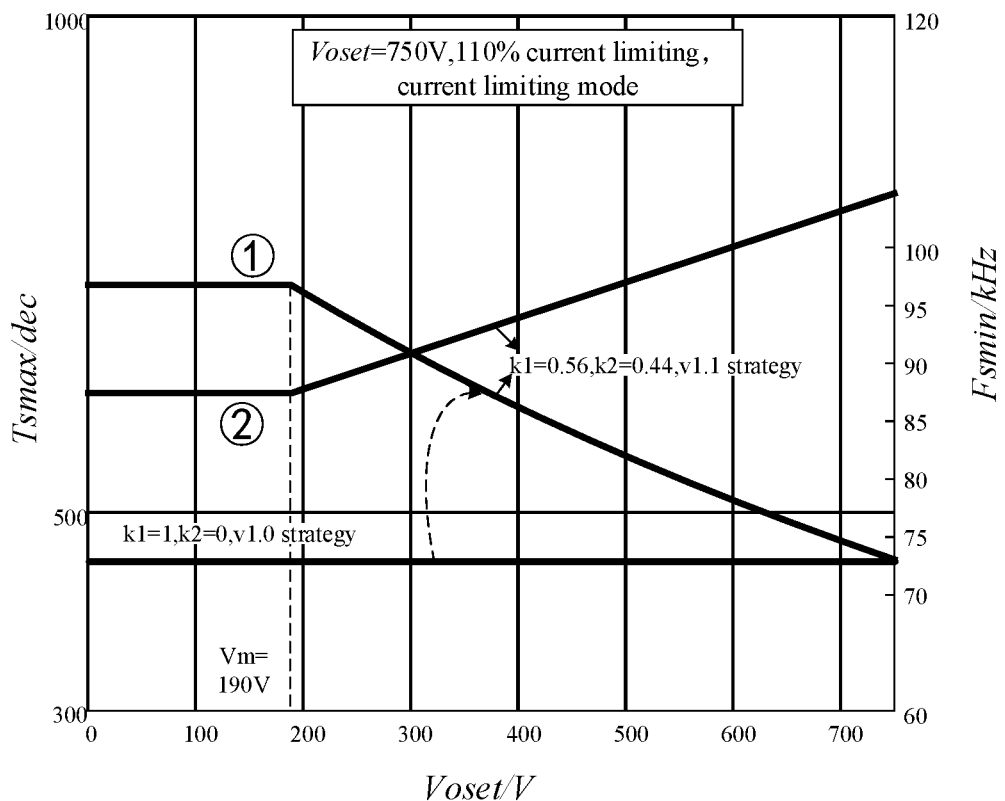
FIG. 10 illustrates a schematic diagram of a relationship curve between a lower limit frequency and an actual voltage of an exemplary resonant converter in a current-limiting mode ($V_o \leq V_{oset}$, and $V_{oset}$=750V, 600V, 400V) consistent with disclosed embodiments of the present disclosure.
Figure 11:
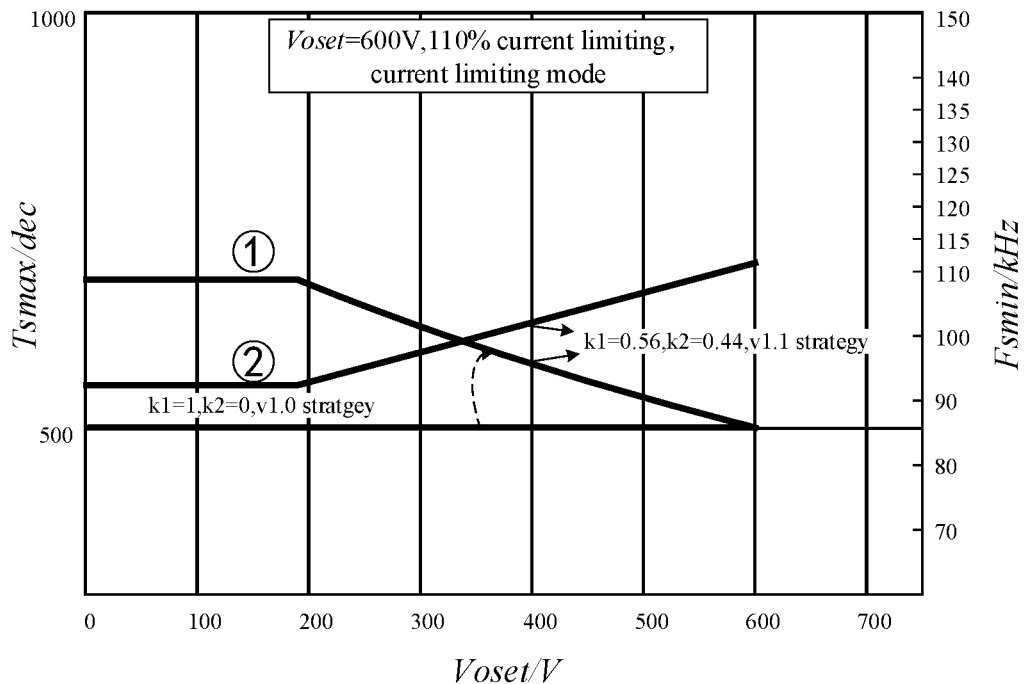
FIG. 11 illustrates a schematic diagram of a relationship curve between a lower limit frequency and an actual voltage of an exemplary resonant converter in a current-limiting mode ($V_o \leq V_{oset}$, $V_{oset}$=600V, and 110% current-limiting) consistent with disclosed embodiments of the present disclosure.
Figure 12:
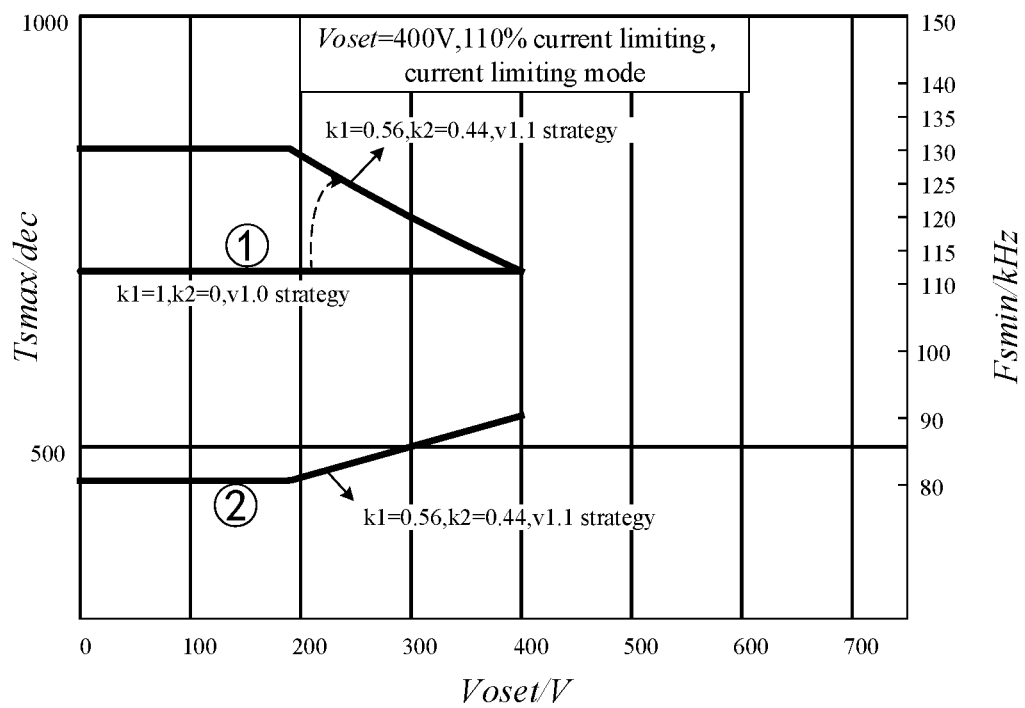
FIG. 12 illustrates a schematic diagram of a relationship curve between a lower limit frequency and an actual voltage of an exemplary resonant converter in a current-limiting mode ($V_o \leq V_{oset}$, $V_{oset}$=750V, and 110% current-limiting) consistent with disclosed embodiments of the present disclosure.

FIGS. 9-12 illustrate the relationship curves between the duty cycle $T_{smax}$ as well as the lower limit frequency $F_{smin}$ and the actual voltage $V_o$ after adopting the improved limiting strategy of lower limit frequency. In FIGS. 9-12, the curve ① represents the relationship between the lower limit frequency $F_{smin}$ and the outputted preset voltage $V_{oset}$, and the curve ② represents the relationship between the duty cycle $T_{smax}$ and the outputted preset voltage $V_{oset}$. Further, the dashed line in FIGS. 10-12 represents the curve ①. When $V_{oset}$=400V, the margin (Δ$f_s$) of the resonant converter operating in a steady state are illustrated in Table 4.

TABLE 4

| $V_{pfc}$ | $V_o$/V | $I_o$/A | $F_{snom}$/KHz | $F_{smin}$/KHz | Δ$f_s$/KHz |
|---|---|---|---|---|---|
| 715 | 400 | 26.7 | 121.457 | 111.9 | 9.5 |
| 681 | 380 | 28.6 | 121.704 | 113.5 | 8.2 |
| 650 | 357 | 30.8 | 125.261 | 115.3 | 10.0 |
| 650 | 320 | 33.3 | 148.148 | 118.3 | 29.9 |
| 650 | 300 | 36.4 | 153.453 | 120.0 | 33.5 |

TABLE 4-continued

| $V_{pfc}$ | $V_o$/V | $I_o$/A | $F_{snom}$/KHz | $F_{smin}$/KHz | Δ$f_s$/KHz |
|---|---|---|---|---|---|
| 650 | 250 | 40.0 | 188.088 | 124.4 | 63.7 |
| 650 | 200 | 44.4 | 205.479 | 129.2 | 76.2 |

As shown in Table 4, $V_{pfc}$ represents the bus voltage, $V_o$ represents the outputted voltage, and $I_o$ represents the outputted current.

The test data of the resonant converter in the current-limiting mode ($V_o$≤$V_{oset}$, $V_{oset}$=750V, and current-limiting of 110%) are illustrated in Table 5.

TABLE 5

| Current-limiting unloading condition | Frequency $F_s$ | Note |
|---|---|---|
| 600 V/33 A -> 730 V/27 A | 78 kHz | Not enter ZCS, not trigger OCP |
| 500 V/40 A -> 570 V/35 A | 82 kHz | Not enter ZCS, not trigger OCP |
| 500 V/40 A -> 670 V/30 A | 75 kHz | Not enter ZCS, not trigger OCP |
| 400 V/50 A -> 480 V/42 A | 85 kHz | Not enter ZCS, not trigger OCP |
| 300 V/40 A -> 452 V/44 A | 83.8 kHz | Not enter ZCS, not trigger OCP |
| 275 V/30 A -> 518 V/40 A | 81 kHz | Not enter ZCS, not trigger OCP |
| 200 V/30 A -> 262 V/30 A | 166 kHz | Not enter ZCS, not trigger OCP |

From the test results, after adopting the improved limiting strategy of the lower limit frequency, the resonant converter may not enter the ZCS region during the current-limiting unloading dynamic process.

To test current-limiting start-up condition, $V_{oset}$=750V, and current-limiting of 110% may be set.

(1) 0->650V/30.6 A: the resonant converter may start up normally.

(2) 0->600V/33.3 A: the outputted voltage may reach 690V, and the resonant converter may operate with heavy load at a frequency limited to the lowest frequency of 76 kHz and may not enter the ZCS region. The power may be reduced, while the bus voltage may be maintained at 825V without active adjustment margin, and may merely be upward adjusted passively to reach 940V, thereby triggering the overvoltage protection of the bus, and, thus, the resonant converter may shut down and restart repeatedly.

(3) 0->550V/36.2 A: the output voltage may reach 636V, and the resonant converter may operate with heavy load at a frequency limited to 78 kHz and may not enter the ZCS region. The bus voltage may reach 940V, thereby triggering the overvoltage protection of the bus, and, thus, the resonant converter may shut down and restart repeatedly.

(4) 0->500V/40 A: the output voltage may reach 565V, and the resonant converter may operate with heavy load at a frequency limited to 81 kHz and may not enter the ZCS region. The bus voltage may reach 940V, thereby triggering the overvoltage protection of the bus, and, thus, the resonant converter may shut down and restart repeatedly.

(5) 0->450V/45 A: the output voltage may reach 500V, and the resonant converter may operate with heavy load at a frequency limited to 81 kHz and may not enter the ZCS region. The bus voltage may reach 950V, thereby triggering the overvoltage protection of the bus, and, thus, the resonant converter may shut down and restart repeatedly.

(6) 0->420V/47 A: the resonant converter may start normally.

(7) 0->400V/500 A: the resonant converter may start normally.

(8) 0->220/30 A: the resonant converter may start normally.

Figure 13:
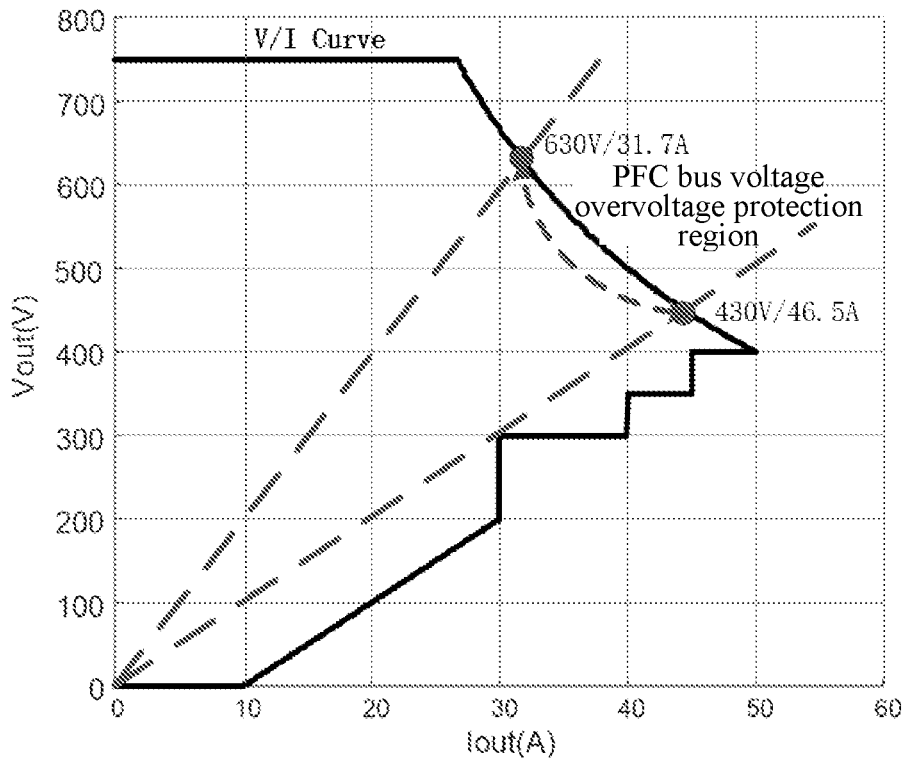
FIG. 13 illustrates a schematic diagram of an overvoltage protection region of a bus voltage when an exemplary resonant converter starts with load and enters a current-limiting state consistent with disclosed embodiments of the present disclosure.

From the test results, the resonant converter may not enter the ZCS region during the dynamic adjustment process from start-up to the current-limiting state, but may trigger the overvoltage protection of the bus voltage in a start-up current-limiting range of 430V/46.5 A-630V/31.7 A, which may cause the resonant converter to shut down and restart, as shown in FIG. 13.

Figure 14:
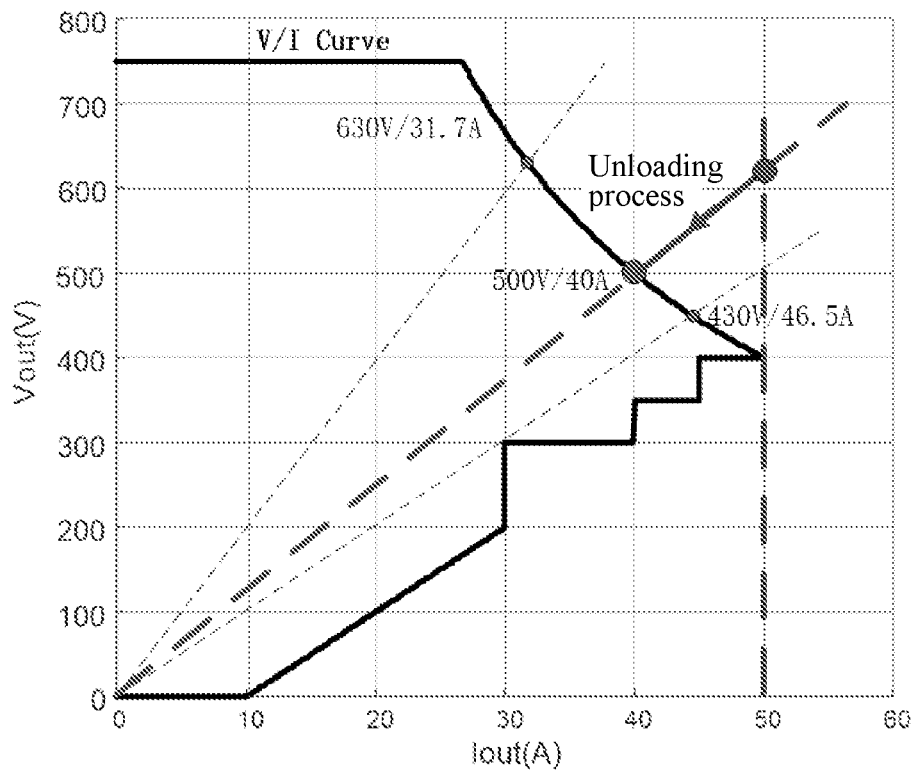
FIG. 14 illustrates a schematic diagram of a dynamic adjustment trajectory when an exemplary resonant converter starts with load and enters a current-limiting state consistent with disclosed embodiments of the present disclosure.
Figure 15:
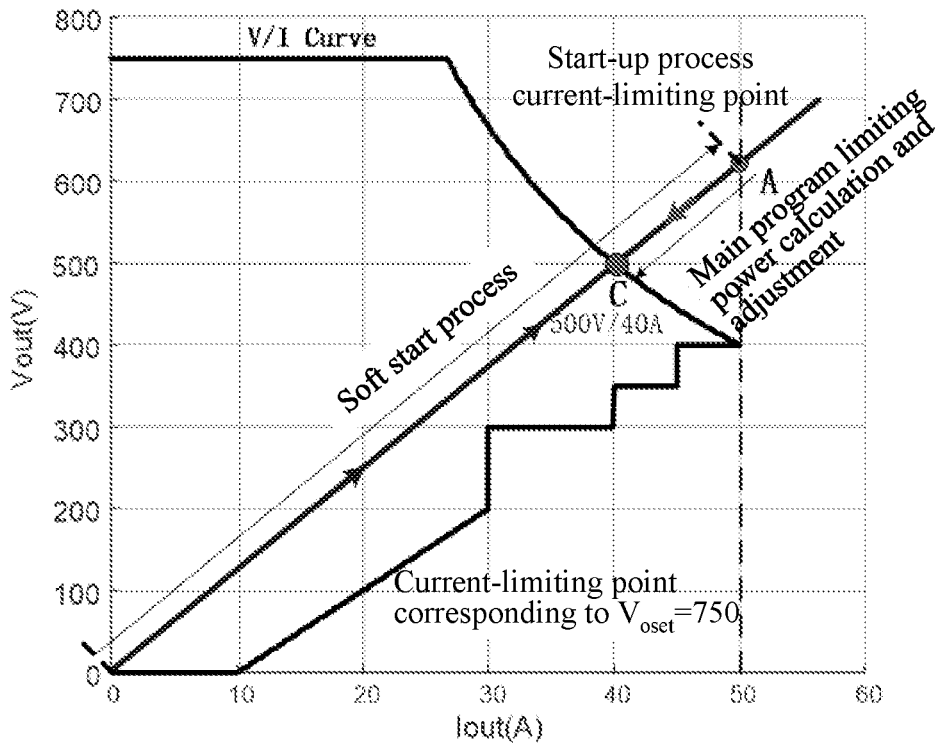
FIG. 15 illustrates a schematic diagram of a trajectory of a start-up operating point of an exemplary resonant converter without a start-up strategy consistent with disclosed embodiments of the present disclosure.

The process of resonant converter from start-up with load to the current-limiting state of 500V/40 A may be used as an example to analyze the overvoltage protection process of the bus voltage. The resonant converter may start with load, and the default current-limiting point may be 110% (50 A). Therefore, the first operating point of the dynamic adjustment process of the start-up process may be the intersection between the 50 A current-limiting curve and the load VI curve. The output power of the resonant converter may exceed 20 kW, while the actually tested output power of the resonant converter at such moment may be 25 kW, such that the output power may be retracted, which may be equivalent to an unloading process. The output voltage may drop and the PFC bus voltage may passively increase, thereby triggering the bus voltage protection point and causing the resonant converter to shut down and restart, as shown in FIG. 14.

From the above analysis, effects of adopting the improved limiting strategy of lower limit frequency and the limit on the lower limit frequency during the start-up process may include following. (1) The resonant converter may not enter the ZCS region and may not trigger the over current protection (OCP) during the dynamic adjustment process of current-limiting unloading. (2) The resonant converter may start and enter the current-limiting state, and may not enter the ZCS region, while in a start-up current-limiting range of 430V/46.5 A-630V/31.7 A, the overvoltage protection of the bus voltage may be triggered, which may cause the resonant converter to shut down and restart.

To solve the problem that the overvoltage protection of the bus causes the resonant converter to restart repeatedly when the resonant converter starts and enters the current-limiting state, the start-up control strategy may include following. A product of an output current preset value of the resonant converter and $k_3$ may be obtained, where $k_3$ may be a constant greater than 1 (e.g., $k_3=1.05$). If the product is greater than or equal to the preset voltage, the preset value may be used as the current-limiting point of the resonant converter during a soft-start process. If the product is less than the preset voltage, the product may be used as the current-limiting point of the resonant converter during a soft-start process.

After the start-up process is completed, the resonant converter may not reach the dynamic operating point A, while may reach the point B. After the start-up process is completed, the resonant converter may release the current-limiting point to 50 A and may perform power calculation and adjustment. Although the dynamic operating point of the resonant converter may reach the point A, such process may not cause the bus voltage to drop. When the power of the resonant converter increases again (equivalent to the unloading process), the bus voltage may raise. However, the process where the bus voltage drops in the previous stage may reduce the maximum value of the bus voltage raised in the later stage, thereby the bus voltage of the resonant converter may be prevented from being too large to trigger the overvoltage protection.

Figure 16:
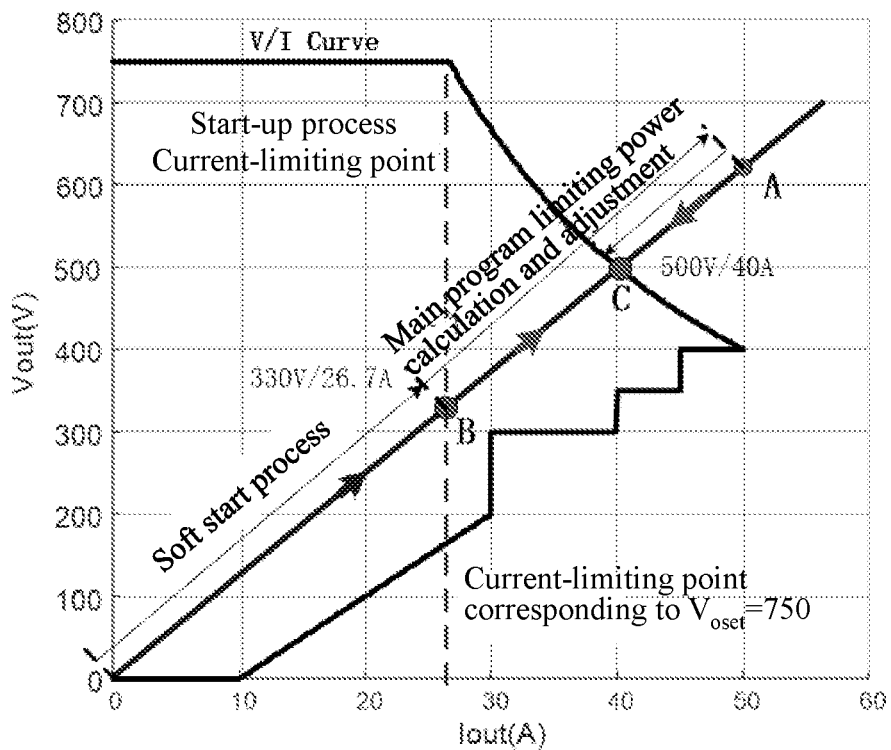
FIG. 16 illustrates a schematic diagram of a trajectory of a start-up operating point of an exemplary resonant converter with a start-up strategy consistent with disclosed embodiments of the present disclosure.

Referring to FIG. 16, after adopting the above-mentioned start-up control strategy, the resonant converter may start and may enter different current-limiting states without triggering the overvoltage protection of the bus. The highest voltage spike of the bus voltage during the start-up process may be approximately 920V, which may be 30V lower than the highest voltage spike of the bus voltage without start-up control strategy. Further, after adopting the start-up control strategy, the start-up time of the resonant converter from start to 750V/26.7 A may not be affected, and the start-up time may be approximately 6 s.

Figure 17:
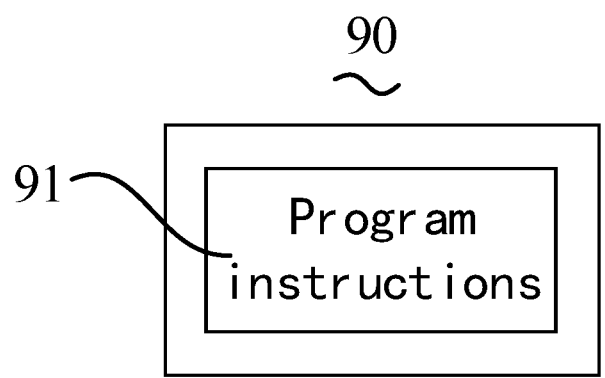
FIG. 17 illustrates a schematic diagram of an exemplary computer storage medium consistent with disclosed embodiments of the present disclosure.

The present disclosure also provides a computer storage medium. FIG. 17 illustrates a schematic diagram of a computer storage medium consistent with various disclosed embodiments of the present disclosure. Referring to FIG. 17, the computer storage medium 90 may store program instructions 91 thereon, and when the program instructions 91 are executed by a processor (not shown), the above-mentioned variable cutoff frequency control method of the resonant converter may be achieved.

The computer storage medium 90 may include but may not be limited to a U disk, an SD card, a PD disc, a mobile hard disk, a large-capacity floppy drive, a flash memory, a multimedia memory card, and a server, etc.

Different from the conventional technology, the variable limit frequency control method of the resonant converter may include: obtaining the first relationship between the lower limit frequency of the resonant converter and the preset voltage outputted by the resonant converter; updating the preset voltage in the first relationship to the correlative voltage between the preset voltage and the actual voltage outputted by the resonant converter, to obtain the second relationship between the lower limit frequency and the preset voltage as well as the actual voltage; and limiting the lower limit frequency of the resonant converter based on the second relationship.

In view of this, the preset voltage in the first relationship between the lower limit frequency of the resonant converter and the preset voltage outputted by the resonant converter may be undated to the correlative voltage between the preset voltage and the actual voltage outputted by the resonant converter. Therefore, the output voltage configured to calculate the lower limit frequency may lag (be less than) the preset voltage, the lower limit frequency obtained according to the second relationship may be substantially small, and may have a certain margin. Thus, the problem of the resonant converter entering the ZCS region may be improved, and the problem of failure of the resonant converter may be improved.

In addition, when the above-disclosed functions are realized through software functional units, and are sold and used as independent products, the software functional units may be stored on computer readable storage media. In other words, the present disclosure provides a storage device having program instructions stored thereon, and the program instructions may be executed to realize the above-disclosed functions. The storage device may include a U disk, an optical disk, and a server, etc. In other words, all or a part of the generic principles or the scope of the present disclosure may be embodied in software products. The computer software products may include a plurality of commands to instruct a computer system (such as a personal computer, a server, a network system, etc.) or a processor to execute all or a part of the procedures described in various embodiments.

In the description of the present disclosure, descriptions with reference to the terms "one embodiment", "certain embodiments", "for example", "specific example", or "certain examples", etc., may refer to specific feature, structure, material, or characteristics included in at least one embodiment or example of the present disclosure described in conjunction with the embodiment or the example. The schematic representations of the above terms may not necessarily refer to a same embodiment or example. Moreover, the described specific feature, structure, material or characteristics may be combined in any one or more embodiments or examples in a suitable manner. In addition, those skilled in the art may combine the different embodiments or examples and the features of the different embodiments or examples without contradicting each other.

In addition, the terms "first" and "second" may merely be used for descriptive purposes, and may not be understood as indicating or implying relative importance or implicitly indicating a quantity of indicated technical features. Therefore, the features defined with "first" and "second" may explicitly or implicitly include at least one of the features. In the description of the present disclosure, "a plurality of" may refer to at least two, such as two, three, etc., unless otherwise specifically defined.

Any process or method described in the flowchart or in other ways herein may be understood as a module, segment or part of codes that include one or more executable instructions for implementing specific logical functions or steps of the process. The scope of the present disclosure may include additional implementations, which may not be in the order shown or discussed above. For example, the additional implementations may be performed simultaneously or in a reverse order according to the functions involved, which may be understood by those skilled in the art.

The logic and/or steps represented in the flowchart or described in other ways herein may be understood as a sequenced list of executable instructions for implementing logic functions, and may be embodied in any computer-readable medium, to be executed by an instruction execution system, equipment, device or a combination thereof (which may be a personal computer, a server, a network device or any other system that is capable of fetching and executing the instructions from the instruction execution system, equipment or device). The "computer-readable medium" may be any device that is capable of containing, storing, communicating, propagating, or transmitting a program to be executed by an instruction execution system, equipment, device or a combination thereof. Specifically, the computer readable medium may include but may not be limited to: an electrical connection portion (an electronic device) with one or more wirings, a portable computer disk case (a magnetic device), random access memory (RAM), read-only memory (ROM), erasable and programmable read-only memory (EPROM or flash memory), a fiber optic device, and a portable compact disc read-only memory (CD-ROM). In addition, the computer-readable medium may even be paper or any other suitable media on which the program can be printed. Because optically scanning, editing, interpreting, or any other necessary process can be performed on the paper or any other media to obtain the program electronically, and then the program may be stored in a computer memory.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A variable cutoff frequency control method of a resonant converter, comprising:
   obtaining a first relationship between a lower limit frequency of the resonant converter and a preset voltage outputted by the resonant converter;
   updating the preset voltage in the first relationship to a correlative voltage between the preset voltage and an actual voltage outputted by the resonant converter, to obtain a second relationship between the lower limit frequency and the correlative voltage; and
   limiting the lower limit frequency of the resonant converter according to the second relationship.

2. The method according to claim 1, wherein obtaining the first relationship between the lower limit frequency of the resonant converter and the preset voltage outputted by the resonant converter includes:
   controlling the resonant converter to output the preset voltage, and lowering a bus voltage of the resonant converter;
   obtaining the lower limit frequency after lowering the bus voltage;
   performing a curve fitting on multiple preset voltages and multiple corresponding lower limit frequencies, to obtain a relationship curve between the lower limit frequency and the preset voltage; and
   obtaining the first relationship between the lower limit frequency and the preset voltage according to the relationship curve.

3. The method according to claim 2, wherein:
   the first relationship satisfies that the lower limit frequency is equal to a quotient of 60M and a duty cycle, wherein the duty cycle is a linear function of the preset voltage.

4. The method according to claim 3, wherein:
   the second relationship satisfies that the correlative voltage is equal to a weighted sum of the preset voltage and the actual voltage.

5. The method according to claim 4, further including:
   obtaining at least two sets of data from the relationship curve, wherein one of the at least two sets of data includes the correlative voltage and the lower limit frequency corresponding to the correlative voltage; and
   determining a weight of the preset voltage and a weight of the actual voltage based on the correlative voltage, the lower limit frequency and the actual voltage.

6. The method according to claim 4, further including:
   when the preset voltage is less than a voltage threshold, updating the preset voltage to the voltage threshold.

7. The method according to claim 5, wherein:
   the preset voltage is in a range of approximately 400V-750V,
   the weight of the preset voltage is in a range of approximately 0.5603-0.5609, and the weight of the actual voltage is in a range of approximately 0.4391-0.4397.

8. The method according to claim 1, further including:
obtaining a product of an output current preset value of the resonant converter and $k_3$, wherein $k_3$ is a constant greater than 1;
when the product is greater than or equal to the preset voltage, configuring the preset value as a current-limiting point of the resonant converter during a soft-start process; and
when the product is less than the preset voltage, configuring the product as the current-limiting point of the resonant converter during the soft-start process.

9. The method according to claim 2, wherein controlling the resonant converter to output the preset voltage, and lowering the bus voltage of the resonant converter include:
configuring the resonant converter to enter a debugging mode, to enable the resonant converter to output the preset voltage and to operate with full load, and
continuously reducing the bus voltage until the resonant converter is not capable of operating stably with load.

10. The method according to claim 2, wherein obtaining the lower limit frequency after lowering the bus voltage includes:
after lowering the bus voltage, obtaining an operating frequency at which the resonant converter is not capable of operating stably with load, and configuring the operating frequency as the lower limit frequency.

11. The method according to claim 2, wherein:
multiple sets of test data are obtained by multiple resonant converters,
one preset voltage corresponds to multiple lower limit frequencies, and
a maximum value of the multiple lower limit frequencies is selected as the lower limit frequency corresponding to the preset voltage.

12. The method according to claim 1, wherein:
in the first relationship, the lower limit frequency is an operating frequency of the resonant converter operated with full load under a different preset voltage on the basis of a constant voltage state.

13. A resonant converter, comprising:
a memory, configured to store program instructions for performing a variable cutoff frequency control method; and
a processor, coupled with the memory and, when executing the program instructions, configured to:
obtain a first relationship between a lower limit frequency of the resonant converter and a preset voltage outputted by the resonant converter;
update the preset voltage in the first relationship to a correlative voltage between the preset voltage and an actual voltage outputted by the resonant converter, to obtain a second relationship between the lower limit frequency and the correlative voltage; and
limit the lower limit frequency of the resonant converter according to the second relationship.

14. The resonant converter according to claim 13, wherein the resonant converter obtains the first relationship between the lower limit frequency of the resonant converter and the preset voltage outputted by the resonant converter by performing:
controlling the resonant converter to output the preset voltage, and lowering a bus voltage of the resonant converter;
obtaining the lower limit frequency after lowering the bus voltage;
performing a curve fitting on multiple preset voltages and multiple corresponding lower limit frequencies, to obtain a relationship curve between the lower limit frequency and the preset voltage; and
obtaining the first relationship between the lower limit frequency and the preset voltage according to the relationship curve.

15. The resonant converter according to claim 13, wherein:
the first relationship satisfies that the lower limit frequency is equal to a quotient of 60M and a duty cycle, wherein the duty cycle is a linear function of the preset voltage.

16. The resonant converter according to claim 13, wherein:
the second relationship satisfies that the correlative voltage is equal to a weighted sum of the preset voltage and the actual voltage.

17. The resonant converter according to claim 13, wherein the resonant converter is further configured to:
obtain a product of an output current preset value of the resonant converter and $k_3$, wherein $k_3$ is a constant greater than 1;
when the product is greater than or equal to the preset voltage, configure the preset value as a current-limiting point of the resonant converter during a soft-start process; and
when the product is less than the preset voltage, configure the product as the current-limiting point of the resonant converter during the soft-start process.

18. A non-transitory computer-readable storage medium, containing program instructions for, when being executed by a processor, performing a variable cutoff frequency control method of a resonant converter, the method comprising:
obtaining a first relationship between a lower limit frequency of the resonant converter and a preset voltage outputted by the resonant converter;
updating the preset voltage in the first relationship to a correlative voltage between the preset voltage and an actual voltage outputted by the resonant converter, to obtain a second relationship between the lower limit frequency and the preset voltage as well as the actual voltage; and
limiting the lower limit frequency of the resonant converter according to the second relationship.

19. The storage medium according to claim 18, wherein obtaining the first relationship between the lower limit frequency of the resonant converter and the preset voltage outputted by the resonant converter includes:
controlling the resonant converter to output the preset voltage, and lowering a bus voltage of the resonant converter;
obtaining the lower limit frequency after lowering the bus voltage;
performing a curve fitting on multiple preset voltages and multiple corresponding lower limit frequencies, to obtain a relationship curve between the lower limit frequency and the preset voltage; and
obtaining the first relationship between the lower limit frequency and the preset voltage according to the relationship curve.

20. The storage medium according to claim 18, wherein:
the first relationship satisfies that the lower limit frequency is equal to a quotient of 60M and a duty cycle, wherein the duty cycle is a linear function of the preset voltage.

* * * * *